(12) United States Patent
Seo et al.

(10) Patent No.: US 8,260,110 B2
(45) Date of Patent: Sep. 4, 2012

(54) RECORDING MEDIUM HAVING DATA STRUCTURE FOR MANAGING REPRODUCTION OF MULTIPLE PLAYBACK PATH VIDEO DATA RECORDED THEREON AND RECORDING AND REPRODUCING METHODS AND APPARATUSES

(75) Inventors: Kang Soo Seo, Kyunggi-do (KR); Eun Sil Hyun, Seoul (KR); Jea Yong Yoo, Seoul (KR); Sung Wan Park, Suwon-si (KR); Byung Jin Kim, Kyunggi-do (KR); Soung Hyun Um, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 920 days.

(21) Appl. No.: 10/602,880

(22) Filed: Jun. 25, 2003

(65) Prior Publication Data

US 2004/0001699 A1 Jan. 1, 2004

(30) Foreign Application Priority Data

Jun. 28, 2002 (KR) .................. 10-2002-0036650

(51) Int. Cl.
*H04N 9/80* (2006.01)
(52) U.S. Cl. ..................... 386/241; 386/248
(58) Field of Classification Search .......... None
See application file for complete search history.

(56) References Cited

U.S. PATENT DOCUMENTS

| | | | |
|---|---|---|---|
| 5,521,898 A | 5/1996 | Ogasawara | |
| 5,559,808 A | 9/1996 | Kostreski et al. | |
| 5,602,956 A | 2/1997 | Suzuki et al. | |
| 5,651,010 A | 7/1997 | Kostreski et al. | |
| 5,729,549 A | 3/1998 | Kostreski et al. | |
| 5,732,185 A | 3/1998 | Hirayama et al. | |
| 5,742,569 A | 4/1998 | Yamamoto et al. | |
| 5,747,136 A | 5/1998 | Shono et al. | |
| 5,771,334 A | 6/1998 | Yamauchi et al. | |
| 5,784,528 A | 7/1998 | Yamane et al. | |
| 5,819,003 A * | 10/1998 | Hirayama et al. | ............... 386/95 |
| 5,821,885 A | 10/1998 | Wise et al. | |
| 5,835,493 A | 11/1998 | Magee et al. | |
| 5,854,873 A | 12/1998 | Mori et al. | |
| 5,870,523 A | 2/1999 | Kikuchi et al. | |
| 5,877,817 A | 3/1999 | Moon | |

(Continued)

FOREIGN PATENT DOCUMENTS

CA 2377690 11/2001

(Continued)

OTHER PUBLICATIONS

Chinese Office Action dated Dec. 14, 2007.
Japanese Office Action dated Jan. 22, 2008.
European Search Report dated Dec. 28, 2007.
European Search Report dated Jan. 2, 2008.
United States Office Action dated Jan. 28, 2008.
United States Office Action dated Jan. 2, 2008.
Russian Office Action dated Jul. 13, 2007.
Chinese Office Action dated Sep. 1, 2006.
Chinese Office Action dated Apr. 27, 2007.

(Continued)

*Primary Examiner* — William C Vaughn, Jr.
*Assistant Examiner* — Heather Jones
(74) *Attorney, Agent, or Firm* — Harness, Dickey & Pierce, P.L.C.

(57) ABSTRACT

The recording medium includes a playlist directory area and at least one navigation information area. The playlist directory area stores a playlist directory including a plurality of playlist files. Each playlist file identifies a portion of the multiple playback path video data and at least a portion of the playlist files associated with different playback paths. The navigation information area stores navigation information at least providing information on one playback path.

21 Claims, 12 Drawing Sheets

U.S. PATENT DOCUMENTS

| | | | |
|---|---|---|---|
| 5,884,004 A * | 3/1999 | Sato et al. | 386/98 |
| 5,895,124 A | 4/1999 | Tsuga et al. | |
| 5,909,257 A | 6/1999 | Ohishi et al. | |
| 5,913,010 A | 6/1999 | Kaneshige et al. | |
| 5,940,255 A | 8/1999 | Uwabo et al. | |
| 5,949,792 A | 9/1999 | Yasuda et al. | |
| 5,953,187 A | 9/1999 | Uwabo et al. | |
| 5,987,126 A | 11/1999 | Okuyama et al. | |
| 5,999,698 A | 12/1999 | Nakai et al. | |
| 6,031,962 A | 2/2000 | Sawabe et al. | |
| 6,035,095 A | 3/2000 | Kaneshige et al. | |
| 6,064,796 A | 5/2000 | Nakamura et al. | |
| 6,067,400 A | 5/2000 | Saeki et al. | |
| 6,167,189 A | 12/2000 | Taira et al. | |
| 6,181,870 B1 | 1/2001 | Okada et al. | |
| 6,181,872 B1 | 1/2001 | Yamane et al. | |
| 6,195,726 B1 | 2/2001 | Hogan | |
| 6,219,488 B1 | 4/2001 | Mori et al. | |
| 6,222,805 B1 | 4/2001 | Mori et al. | |
| 6,285,825 B1 | 9/2001 | Miwa et al. | |
| 6,321,027 B2 | 11/2001 | Honjo | |
| 6,336,002 B1 | 1/2002 | Yamauchi et al. | |
| 6,343,062 B1 | 1/2002 | Furukawa et al. | |
| 6,351,442 B1 | 2/2002 | Tagawa et al. | |
| 6,353,613 B1 | 3/2002 | Kubota et al. | |
| 6,360,055 B1 | 3/2002 | Kaneshige et al. | |
| 6,377,747 B1 | 4/2002 | Murase et al. | |
| 6,377,774 B1 | 4/2002 | Maul et al. | |
| 6,385,388 B1 | 5/2002 | Lewis et al. | |
| 6,385,389 B1 | 5/2002 | Maruyama et al. | |
| 6,385,394 B1 | 5/2002 | Okada et al. | |
| 6,385,398 B1 | 5/2002 | Matsumoto | |
| 6,393,196 B1 | 5/2002 | Yamane et al. | |
| 6,393,574 B1 | 5/2002 | Kashiwagi et al. | |
| 6,415,101 B1 | 7/2002 | Decarmo et al. | |
| 6,424,797 B1 | 7/2002 | Murase et al. | |
| 6,445,872 B1 | 9/2002 | Sano et al. | |
| 6,470,140 B1 | 10/2002 | Sugimoto et al. | |
| 6,470,460 B1 | 10/2002 | Kashiwagi et al. | |
| 6,480,669 B1 | 11/2002 | Tsumagari et al. | |
| 6,504,996 B1 | 1/2003 | Na et al. | |
| 6,515,101 B1 | 2/2003 | Sheares | |
| 6,546,195 B2 | 4/2003 | Kashiwagi et al. | |
| 6,556,774 B2 | 4/2003 | Tsumagari et al. | |
| 6,564,006 B1 | 5/2003 | Mori et al. | |
| 6,567,608 B2 | 5/2003 | Mori et al. | |
| 6,573,819 B1 | 6/2003 | Oshima et al. | |
| 6,584,277 B2 | 6/2003 | Tsumagari et al. | |
| 6,603,517 B1 | 8/2003 | Shen et al. | |
| 6,618,396 B1 | 9/2003 | Kondo et al. | |
| 6,654,543 B2 | 11/2003 | Ando et al. | |
| 6,788,883 B1 | 9/2004 | Park et al. | |
| 6,801,713 B2 | 10/2004 | Yagawa et al. | |
| 6,901,078 B2 | 5/2005 | Morris | |
| 6,904,227 B1 | 6/2005 | Yamamoto et al. | |
| 7,024,102 B1 | 4/2006 | Inoshita et al. | |
| 7,072,573 B2 | 7/2006 | Okada et al. | |
| 7,106,946 B1 | 9/2006 | Kato | |
| 7,124,303 B2 | 10/2006 | Candelore et al. | |
| 7,236,687 B2 | 6/2007 | Kato et al. | |
| 2001/0033517 A1 | 10/2001 | Ando et al. | |
| 2001/0038745 A1 | 11/2001 | Sugimoto et al. | |
| 2001/0043790 A1 | 11/2001 | Saeki et al. | |
| 2001/0047378 A1 | 11/2001 | Seo et al. | |
| 2001/0053280 A1 | 12/2001 | Yamauchi et al. | |
| 2002/0015383 A1 | 2/2002 | Ueno | |
| 2002/0015581 A1 | 2/2002 | Ando et al. | |
| 2002/0021761 A1 | 2/2002 | Zhang et al. | |
| 2002/0031336 A1 | 3/2002 | Okada et al. | |
| 2002/0044757 A1 | 4/2002 | Kawamura et al. | |
| 2002/0046328 A1 | 4/2002 | Okada | |
| 2002/0076201 A1 | 6/2002 | Tsumagari et al. | |
| 2002/0097981 A1 | 7/2002 | Seo et al. | |
| 2002/0097984 A1 | 7/2002 | Abecassis | |
| 2002/0106196 A1 | 8/2002 | Yamauchi et al. | |
| 2002/0126991 A1 | 9/2002 | Kawamura et al. | |
| 2002/0127002 A1 | 9/2002 | Mori et al. | |
| 2002/0131767 A1 | 9/2002 | Auwens et al. | |
| 2002/0145702 A1 * | 10/2002 | Kato et al. | 352/1 |
| 2002/0145708 A1 | 10/2002 | Childers et al. | |
| 2002/0150383 A1 | 10/2002 | Kato et al. | |
| 2002/0159368 A1 | 10/2002 | Noda et al. | |
| 2002/0180803 A1 | 12/2002 | Kaplan et al. | |
| 2002/0196365 A1 | 12/2002 | Cho et al. | |
| 2002/0197059 A1 | 12/2002 | Cho et al. | |
| 2003/0002194 A1 | 1/2003 | Andoh | |
| 2003/0026597 A1 | 2/2003 | Cho et al. | |
| 2003/0108164 A1 * | 6/2003 | Laurin et al. | 379/88.01 |
| 2003/0113096 A1 | 6/2003 | Taira et al. | |
| 2003/0118327 A1 | 6/2003 | Um et al. | |
| 2003/0123849 A1 | 7/2003 | Nallur et al. | |
| 2003/0133509 A1 | 7/2003 | Yanagihara et al. | |
| 2003/0161615 A1 | 8/2003 | Tsumagari et al. | |
| 2003/0221055 A1 | 11/2003 | Okada | |
| 2003/0235403 A1 | 12/2003 | Seo et al. | |
| 2003/0235404 A1 | 12/2003 | Seo et al. | |
| 2003/0235405 A1 | 12/2003 | Seo et al. | |
| 2004/0001700 A1 | 1/2004 | Seo et al. | |
| 2004/0068606 A1 | 4/2004 | Kim et al. | |
| 2004/0086261 A1 | 5/2004 | Hanes | |
| 2004/0156621 A1 | 8/2004 | Seo et al. | |
| 2004/0179819 A1 | 9/2004 | Cho et al. | |
| 2004/0179820 A1 | 9/2004 | Kashiwagi et al. | |
| 2004/0179827 A1 | 9/2004 | Cho et al. | |
| 2004/0247290 A1 | 12/2004 | Seo et al. | |
| 2004/0252975 A1 | 12/2004 | Cho et al. | |
| 2005/0019007 A1 | 1/2005 | Kato et al. | |
| 2005/0025459 A1 | 2/2005 | Kato et al. | |
| 2005/0025461 A1 | 2/2005 | Kato et al. | |
| 2005/0036763 A1 | 2/2005 | Kato et al. | |
| 2005/0206783 A1 | 9/2005 | Kato | |
| 2006/0098936 A1 | 5/2006 | Ikeda et al. | |
| 2006/0222340 A1 | 10/2006 | Yamauchi et al. | |

FOREIGN PATENT DOCUMENTS

| | | |
|---|---|---|
| CN | 1134583 | 10/1996 |
| CN | 1150293 | 5/1997 |
| CN | 1197573 A | 10/1998 |
| CN | 1220458 | 6/1999 |
| CN | 1237852 | 12/1999 |
| CN | 1251461 | 4/2000 |
| CN | 1272209 | 11/2000 |
| EP | 0689206 | 12/1995 |
| EP | 0723216 | 9/1996 |
| EP | 0737980 | 4/1997 |
| EP | 0788105 | 8/1997 |
| EP | 0798722 | 10/1997 |
| EP | 0814475 | 12/1997 |
| EP | 0847198 | 3/1998 |
| EP | 0836189 | 4/1998 |
| EP | 0847195 | 6/1998 |
| EP | 0836183 | 8/1998 |
| EP | 0875856 | 11/1998 |
| EP | 0 896 337 A2 | 2/1999 |
| EP | 0903744 | 3/1999 |
| EP | 0917355 | 5/1999 |
| EP | 0918438 | 6/1999 |
| EP | 0920203 | 6/1999 |
| EP | 0873022 | 10/1999 |
| EP | 0961279 | 12/1999 |
| EP | 1003338 A2 | 5/2000 |
| EP | 1 043 724 | 10/2000 |
| EP | 0940983 | 10/2000 |
| EP | 1120789 | 8/2001 |
| EP | 1126454 | 8/2001 |
| EP | 1198132 | 4/2002 |
| EP | 1198133 | 4/2002 |
| EP | 1202568 | 7/2002 |
| EP | 1469677 | 10/2004 |
| EP | 1081885 | 3/2005 |
| GB | 2351888 | 1/2001 |
| JP | 01-003781 | 1/1989 |
| JP | 01-116819 | 5/1989 |
| JP | 08-088832 | 4/1996 |
| JP | 08-235833 | 9/1996 |
| JP | 8-511146 | 11/1996 |
| JP | 09-023403 | 1/1997 |

| | | |
|---|---|---|
| JP | 9-106631 | 4/1997 |
| JP | 09-251759 | 9/1997 |
| JP | 9-259527 | 10/1997 |
| JP | 10-027461 | 1/1998 |
| JP | 10-032780 | 2/1998 |
| JP | 10-051737 | 2/1998 |
| JP | 10-092159 | 4/1998 |
| JP | 10-155138 | 6/1998 |
| JP | 10-255443 | 9/1998 |
| JP | 10-271449 | 10/1998 |
| JP | 10-299698 | 10/1998 |
| JP | 10-299698 | 11/1998 |
| JP | 10-340570 | 12/1998 |
| JP | 11-041563 | 2/1999 |
| JP | 11-066813 | 3/1999 |
| JP | 11-103444 | 4/1999 |
| JP | 11-134812 | 5/1999 |
| JP | 11-185463 | 7/1999 |
| JP | 11-259976 | 9/1999 |
| JP | 11-341443 | 12/1999 |
| JP | 11-346341 | 12/1999 |
| JP | 2000-030414 | 1/2000 |
| JP | 10/40667 | 2/2000 |
| JP | 2000-041066 | 2/2000 |
| JP | 2000-069437 | 3/2000 |
| JP | 2000-113602 | 4/2000 |
| JP | 2000-149514 | 5/2000 |
| JP | 2000-152179 | 5/2000 |
| JP | 2000-235779 | 8/2000 |
| JP | 2000-293938 | 10/2000 |
| JP | 2000-299836 | 10/2000 |
| JP | 2001-024973 | 1/2001 |
| JP | 2001-024985 | 1/2001 |
| JP | 2001-067802 | 3/2001 |
| JP | 2001-111929 | 4/2001 |
| JP | 2001-111944 | 4/2001 |
| JP | 2001-111960 | 4/2001 |
| JP | 2001-169246 | 6/2001 |
| JP | 2001-297535 | 10/2001 |
| JP | 2001-332006 | 11/2001 |
| JP | 2002-056651 | 2/2002 |
| JP | 2002-083486 | 3/2002 |
| JP | 2002-084495 | 3/2002 |
| JP | 2002-112179 | 4/2002 |
| JP | 2002-150685 | 5/2002 |
| JP | 2002-158971 | 5/2002 |
| JP | 2002-158972 | 5/2002 |
| JP | 2002-158974 | 5/2002 |
| JP | 2002/348442 | 5/2002 |
| JP | 2002-171472 | 6/2002 |
| JP | 2002-176623 | 6/2002 |
| JP | 2002-216460 | 8/2002 |
| JP | 2002-222581 | 8/2002 |
| JP | 2002-329371 | 11/2002 |
| JP | 2003-087744 | 3/2003 |
| JP | 2003-116100 | 4/2003 |
| JP | 2005-538497 | 12/2005 |
| JP | 2006/503400 | 1/2006 |
| JP | 4441884 | 3/2010 |
| KR | 10-1999-0022858 | 10/1997 |
| KR | 10-2000-0031861 | 6/2000 |
| KR | 10-2000-0055028 | 9/2000 |
| KR | 10-2000-0056179 | 9/2000 |
| KR | 10-2000-0065876 | 11/2000 |
| KR | 10-2001-0022702 | 3/2001 |
| KR | 10-0294884 | 4/2001 |
| KR | 10-2001-0098007 | 11/2001 |
| KR | 10-2001-0098101 | 11/2001 |
| KR | 10-2001-0107578 | 12/2001 |
| KR | 10-2002-0006674 | 1/2002 |
| KR | 10-2002-0020919 | 3/2002 |
| KR | 10-2002-0097454 | 12/2002 |
| KR | 10-2002-0097455 | 12/2002 |
| KR | 10-2004-0000290 | 1/2004 |
| KR | 10-2004-0030992 | 4/2004 |
| KR | 10-2004-0030994 | 4/2004 |
| KR | 10-2004-0030995 | 4/2004 |
| KR | 10-2004-0041581 | 5/2004 |
| TW | 391548 | 5/2000 |
| WO | WO 97/06531 | 2/1997 |
| WO | WO 97/13364 | 4/1997 |
| WO | WO 97/13365 | 4/1997 |
| WO | WO 97/13366 | 4/1997 |
| WO | WO 97/31374 | 8/1997 |
| WO | WO 97/39451 | 10/1997 |
| WO | WO 98/00952 | 1/1998 |
| WO | WO 99/08281 | 2/1999 |
| WO | WO 99/34601 | 7/1999 |
| WO | WO 00/02195 | 1/2000 |
| WO | WO 00/05883 | 2/2000 |
| WO | WO 00/42515 | 7/2000 |
| WO | WO 00/60598 | 10/2000 |
| WO | WO 00/62295 | 10/2000 |
| WO | WO 01/80239 | 10/2001 |
| WO | WO 01/82604 | 11/2001 |
| WO | WO 01/82606 | 11/2001 |
| WO | WO 01/82608 A1 | 11/2001 |
| WO | WO 01/82609 | 11/2001 |
| WO | WO 01/82610 | 11/2001 |
| WO | WO 04/001748 | 12/2003 |
| WO | WO 04/001750 | 12/2003 |
| WO | WO 04/001753 A1 | 12/2003 |
| WO | WO 2004-025452 | 3/2004 |
| WO | WO 2004/042723 | 5/2004 |
| WO | WO 2004/45206 | 5/2004 |
| WO | WO 2004-075183 | 9/2004 |
| WO | WO 2004/077417 | 9/2004 |
| WO | WO 2004/079736 | 9/2004 |
| WO | WO 2004/081939 | 9/2004 |
| WO | WO 2004/086371 | 10/2004 |

OTHER PUBLICATIONS

Office Action for corresponding European Application No. 03761863.4 dated Mar. 31, 2008.
Office Action for corresponding Japanese Application No. 2004-517368 dated May 7, 2008.
Office Action for corresponding Japanese Application No. 2004-517390 dated May 7, 2008.
Office Action issued Apr. 22, 2008 by the Japanese Patent Office in counterpart Japanese Patent Application No. 2006-196199.
Office Action for corresponding Japanese Application No. 2004-551246 dated May 20, 2008.
European Search Report dated Aug. 13, 2008.
United States Office Action dated Oct. 15, 2009.
European Search Report dated Nov. 30, 2009.
Japanese Office Action dated Jul. 7, 2009.
Australian Office Action dated Jul. 9, 2009.
Japanese Office Action dated Jul. 17, 2009 with English translation.
European Search Report dated Oct. 8, 2009.
Australian Office Action dated Dec. 14, 2009 for corresponding Australian Application No. 2003243049.
European Search Report dated Feb. 3, 2010 for corresponding European Application No. 03761845.1.
United States Office Action dated Dec. 31, 2009 for corresponding U.S. Appl. No. 10/702,557.
Japanese Office Action dated Jun. 25, 2010 in corresponding Japanese Application No. 2004-555088.
English translation of Indian Office Action dated Jun. 14, 2010 in corresponding Indian Application No. 2003/DELNP/2004.
Office Action dated Oct. 18, 2010 in corresponding U.S. Appl. No. 10/702,557.
European Office Action dated Nov. 3, 2010 in corresponding European Application No. 03761863.4.
E-Mail EPO-DVD Licensing Corporation.
Japanese Trial Decision dated Dec. 14, 2010 for JP Application No. 2004-517368.
European Office Action dated May 6, 2011 for Application No. 03 733 603.9-2223.
Japanese Office Action dated Jun. 3, 2011, issued for Application No. 2004-553244 and English translation thereof.
Japanese Office Action dated Nov. 4, 2008.

* cited by examiner

RECORDING MEDIUM HAVING DATA STRUCTURE FOR MANAGING REPRODUCTION OF MULTIPLE PLAYBACK PATH VIDEO DATA RECORDED THEREON AND RECORDING AND REPRODUCING METHODS AND APPARATUSES

BACKGROUND OF THE INVENTION

1. Field of the Invention

The present invention relates to a recording medium having a data structure for managing reproduction of at least video data recorded thereon as well as methods and apparatuses for reproduction and recording.

2. Description of the Related Art

The standardization of new high-density read only and rewritable optical disks capable of recording large amounts of high-quality video and audio data has been progressing rapidly and new optical disk related products are expected to be commercially available on the market in the near future. The Blu-ray Disc Rewritable (BD-RW) is one example of these new optical disks.

FIG. 1 illustrates the file structure of the BD-RW. The file structure or data structure provides for managing the reproduction of the video and audio data recorded on the BD-RW. As shown, the data structure includes a root directory that contains at least one BDAV directory. The 'info.bdav', 'menu.tidx', and 'mark.tidx', a PLAYLIST subdirectory in which playlist files (*.rpls and *.vpls) are stored, a CLIPINF subdirectory in which clip information files (*.clpi) are stored, and a STREAM subdirectory in which MPEG2-formatted A/V stream clip files (*.m2ts) corresponding to the clip information files are stored. In addition to illustrating the data structure of the optical disk, FIG. 1 represents the areas of the optical disk. For example, the general information file info.bdav is stored in a general information area or areas on the optical disk.

Because the BD-RW data structure and disk format as illustrated in FIG. 1 is well-known and readily available, only a brief overview of the file structure will be provided in this disclosure.

As alluded to above, the STREAM directory includes MPEG2-formatted A/V stream files called clips. The STREAM directory may also include a special type of clip referred to as a bridge-clip A/V stream file. A bridge-clip is used for making seamless connection between two or more presentation intervals selected in the clips, and generally have a small data size compared to the clips. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number).

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.bdav file is a general information file that provides general information for managing the reproduction of the A/V stream recorded on the optical disk. More specifically, the info.bdav file includes, among other things, a table of playlists that identifies the files names of the playlist in the PLAYLIST directory of the same BDAV directory.

The menu.tidx, menu.tdt1 and menu.tdt2 files store information related to menu thumbnails. The mark.tidx, mark.tdt1 and mark.tdt2 files store information that relates to mark thumbnails. Because these files are not particularly relevant to the present invention, they will not be discussed further.

The standardization for high-density read-only optical disks such as the Blu-ray ROM (BD-ROM) is still under way. An effective data structure for managing reproduction of video and audio data recorded on the high-density read-only optical disk such as a BD-ROM is not yet available.

SUMMARY OF THE INVENTION

The recording medium according to the present invention includes a data structure for managing reproduction of at least multiple playback path video data recorded on the recording medium.

According to one exemplary embodiment, the recording medium includes multiple playback path video data of a title. A playlist directory area of the recording medium stores a playlist directory including a plurality of playlist files. Each playlist file identifies a portion of the multiple playback path video data and at least a portion of the playlist files are associated with different playback paths. At least one navigation information area stores navigation information at least providing information on one playback path. In one exemplary embodiment, the different playback paths of the title are different stories of the title.

In another exemplary embodiment, the recording medium includes a playlist directory area storing a playlist directory including a plurality of playlists. At least a number of the playlists are divided into groups and each group is associated with a different playback path. In a further aspect of this embodiment, at least one navigation information area of the recording medium stores navigation information at least providing information on one playback path. In one exemplary embodiment, the different playback paths of the title are different stories of the title.

According to an exemplary embodiment associated with any of the described embodiments, a group of playlist files is associated with each playback path. According to a further associated embodiment, the navigation information at least provides information linking one playlist file to another playlist file in the same playback path. In one exemplary embodiment, the navigation information indicates a next playlist file to playback after a particular playlist file is played back.

According to another exemplary embodiment associated with any of the described embodiments, a data area of the recording medium stores clips of the multiple playback path video data, and the video data for each playback path is stored in a different clip.

The present invention further provides apparatuses and methods for recording and reproducing the data structure according to the present invention. For example, in one method of reproduction, at least one playlist associated with a user selected playback path is reproduced based on navigation information recorded on the recording medium.

BRIEF DESCRIPTION OF THE DRAWINGS

The above features and other advantages of the present invention will be more clearly understood from the following detailed description taken in conjunction with the accompanying drawings, in which.

DESCRIPTION OF THE PREFERRED EMBODIMENTS

In order that the invention may be fully understood, preferred embodiments thereof will now be described with reference to the accompanying drawings.

Figure 1:
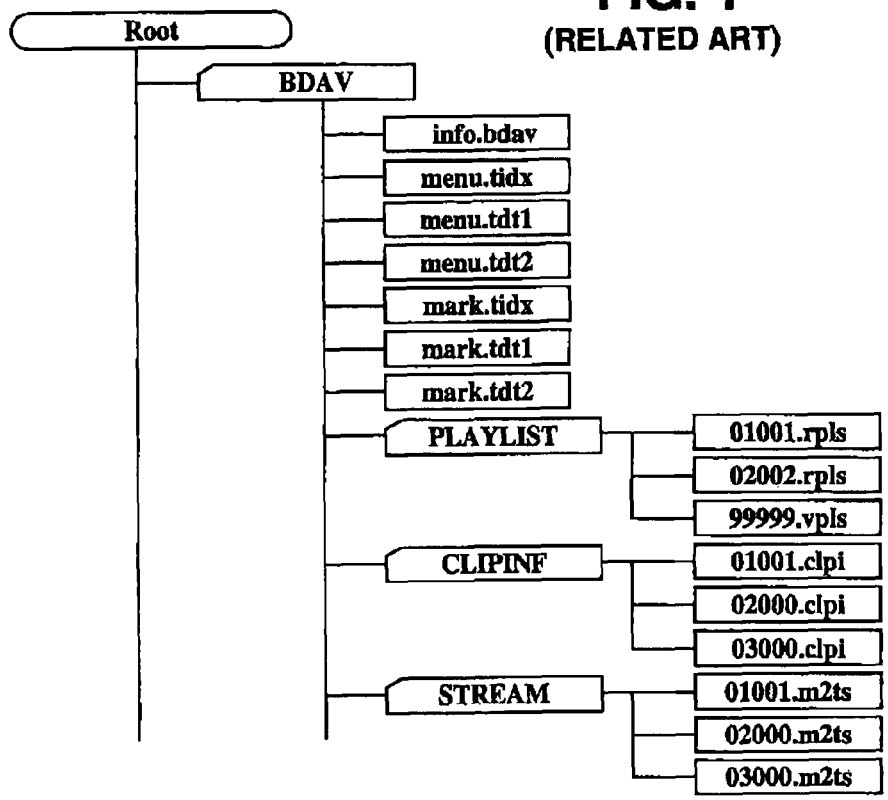
FIG. 1 illustrates the prior art file or data structure of a rewritable optical disk according to the Blu-ray Disc Rewritable (BD-RW) standard.
Figure 2:
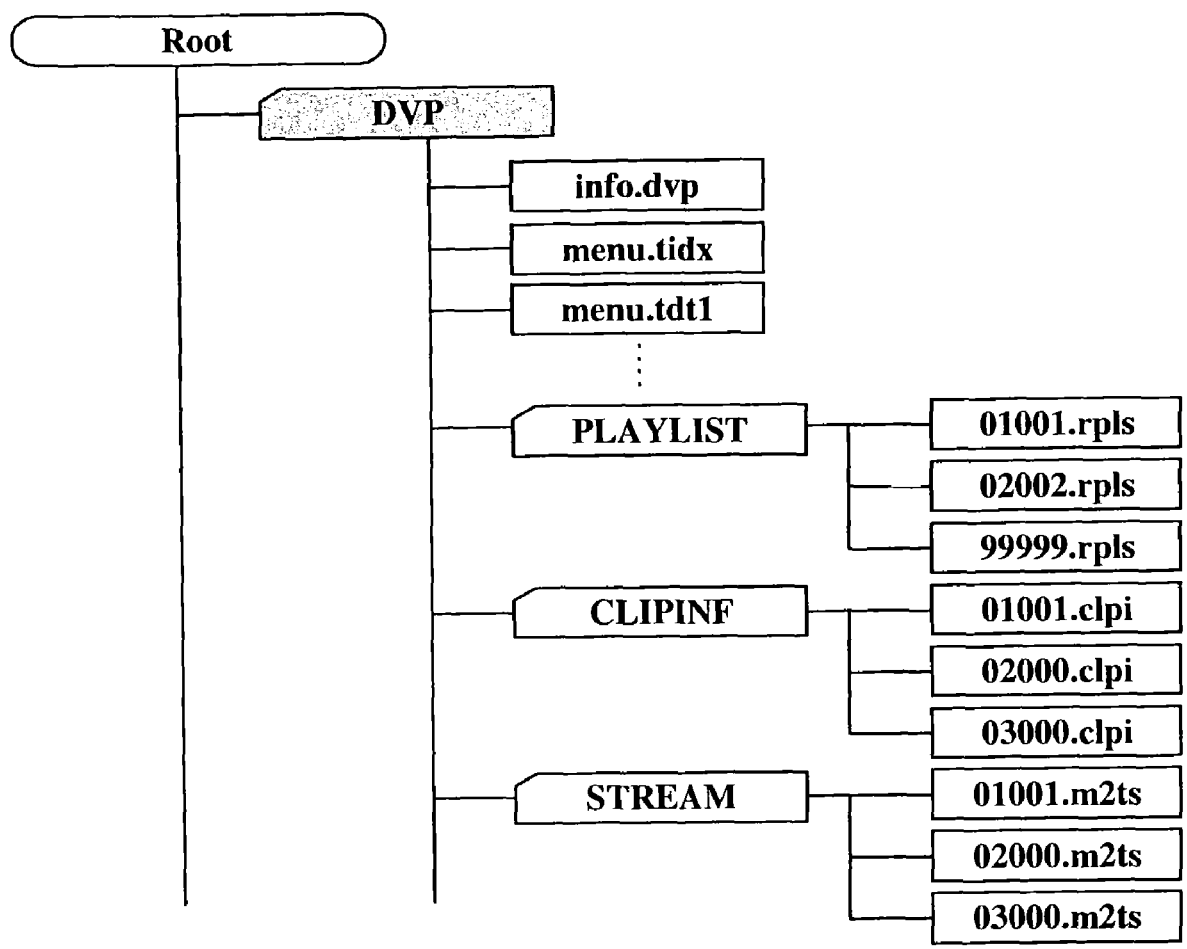
FIG. 2 illustrates an exemplary embodiment of a recording medium file or data structure according to the present invention.

A high-density optical disk, for example, a Blu-Ray ROM (BD-ROM) in accordance with the invention may have a file or data structure for managing reproduction of video and audio data as shown in FIG. 2. Many aspects of the data structure according to the present invention shown in FIG. 2 are similar to that of the BD-RW standard discussed with respect to FIG. 1. As such these aspects will not be described in great detail.

As shown in FIG. 2, the root directory contains at least one DVP directory. The DVP directory includes a general information file info.dvp, menu files menu.tidx, menu.tdt1 among others, a PLAYLIST directory in which playlist files (e.g., real (*.rpls) and virtual (*.vpls)) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clips. The STREAM directory may also include a special type of clip referred to as a bridge-clip A/V stream file. A bridge-clip is used for making seamless connection between two or more presentation intervals selected in the clips, and generally have a small data size compared to the clips. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The use of the PID in the present invention will be described in greater detail below.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number).

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.dvp file is a general information file that provides general information for managing the reproduction of the A/V streams recorded on the optical disk.

Figure 3:
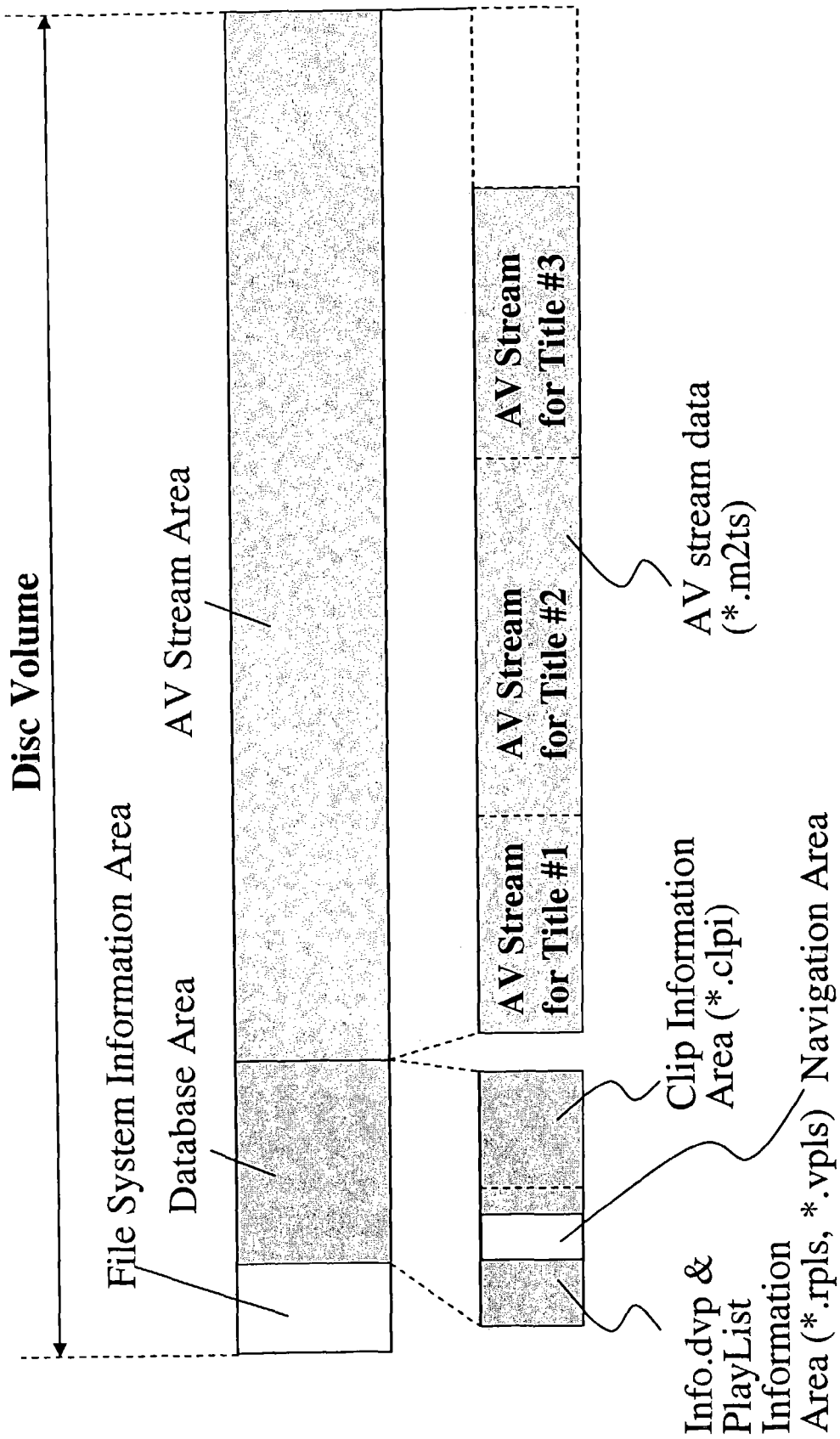
FIG. 3 illustrates an example of a recording medium having the data structure of FIG. 2 stored thereon.

In addition to illustrating the data structure of the recording medium according to an embodiment of the present invention, FIG. 2 represents the areas of the recording medium. For example, the general information file is recorded in one or more general information areas, the playlist directory is recorded in one or more playlist directory areas, each playlist in a playlist directory is recorded in one or more playlist areas of the recording medium, etc. FIG. 3 illustrates an example of a recording medium having the data structure of FIG. 2 stored thereon. As shown, the recording medium includes a file system information area, a data base area and an A/V stream area. The data base area includes a general information file and playlist information area and a clip information area. The general information file and playlist information area have the general information file recorded in a general information file area thereof, and the PLAYLIST directory and playlist files recorded in a playlist information—area thereof. The clip information area has the CLIPINFO directory and associated clip information files recorded therein. The A/V stream area has the A/V streams for the various titles recorded therein.

Video and audio data are typically organized as individual titles; for example, different movies represented by the video and audio data are organized as different titles. Furthermore, a title may be organized into individual chapters in much the same way a book is often organized into chapters.

Because of the large storage capacity of the newer, high-density recording media such as BD-ROM optical disks, different titles, various versions of a title or portions of a title may be recorded, and therefore, reproduced from the recording media. For example, video data representing different camera angles may be recorded on the recording medium. As another example, versions of title or portions thereof associated with different languages may be recorded on the recording medium. As a still further example, a director's version and a theatrical version of a title may be recorded on the recording medium. Or, an adult version, young adult version and young child version (i.e., different parental control versions) of a title or portions of a title may be recorded on the recording medium. Each version represents a different reproduction path, and the video data in these instances is referred to as multiple reproduction path video data. It will be appreciated that the above examples of multiple reproduction path video data are not limiting, and the present invention is applicable to any type or combination of types of multiple reproduction path video data.

Also, a title may have different possible stories forming a portion of the title. This is particularly true of interactive titles where the playback path of portions of the title (e.g., the story paths for a particular portion of a title) depends on user input. Accordingly, these multi-story titles may have numerous playback paths depending on the user input. As will be described in detail below with respect to embodiments of the present invention, the data structures according to the present invention include story or navigation information for managing and controlling the reproduction of multiple playback paths (e.g., stories) associated with the one title.

For example, in one embodiment the navigation information includes concatenation information of previous and next playitems (Prev_PI and Next_PI) and concatenation information of previous and next playlists (Prev_PL and Next_PL). As another example, path number information for indicating the paths of the multiple playback paths may be recorded in the playlist files of the title.

Figure 4:
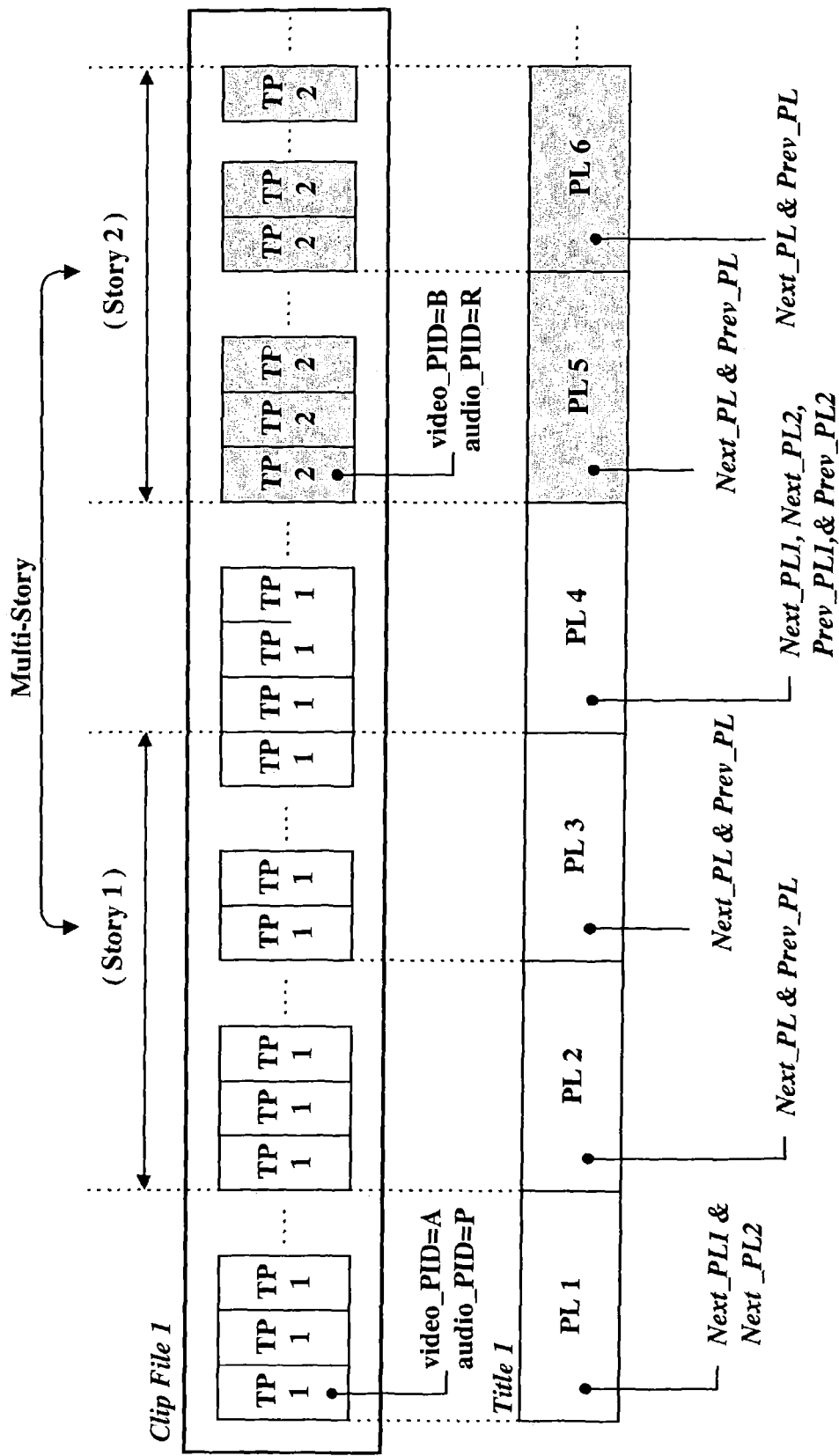
FIG. 4 illustrates a first embodiment of managing multiple playback path data streams in accordance with the present invention.

FIG. 4 illustrates a first embodiment of managing multi-story data streams in accordance with the data structure of FIG. 2. At least one clip file contained and recorded in the file structure of the BD-ROM is linked to a plurality of playlists (PL1, PL2, PL3, . . . ), for example, and managed with the a title. A/V streams of multiple stories contained and recorded in the clip file are recorded in the form of TPs based on MPEG 2.

Different PIDs for identifying each story are recorded in the TPs. Stated another way, the TPs associated with different stories have different PIDs. As shown in FIG. 4, for example, Video_PID=A and Audio_PID=P are contained and recorded in first transport packets TP1 of a first story, which is contained and recorded in the clip file. Video_PID=B and Audio_PID=R are contained and recorded in second transport packets TP2 of a second story, which is contained and recorded in the clip file. The first and second transport packets TP1 and TP2 of the first and second stories are sequentially and seamlessly recorded in a data recording area of the BD-ROM such that the first and second transport packets TP1 and TP2 can be seamlessly reproduced.

FIG. 4 further shows that concatenation information of the previous and next playlists (Prev_PL and Next_PL) for designating the order of reproduction of multiple playback paths may be contained and recorded as navigation information in the plurality of playlists (PL1, PL2, PL3, . . . ) linked to the clip file. Namely, the navigation information links playlists together. During playback, this information indicates the next playlist to playback after playback of a particular playlist. The navigation information for playlists of a particular story or playback path creates a linked group of playlists associated with that playback path. FIG. 3 illustrates one navigation area of the recording medium storing this navigation information; however, it will be understood that numerous navigation areas may be provided.

Figure 5:
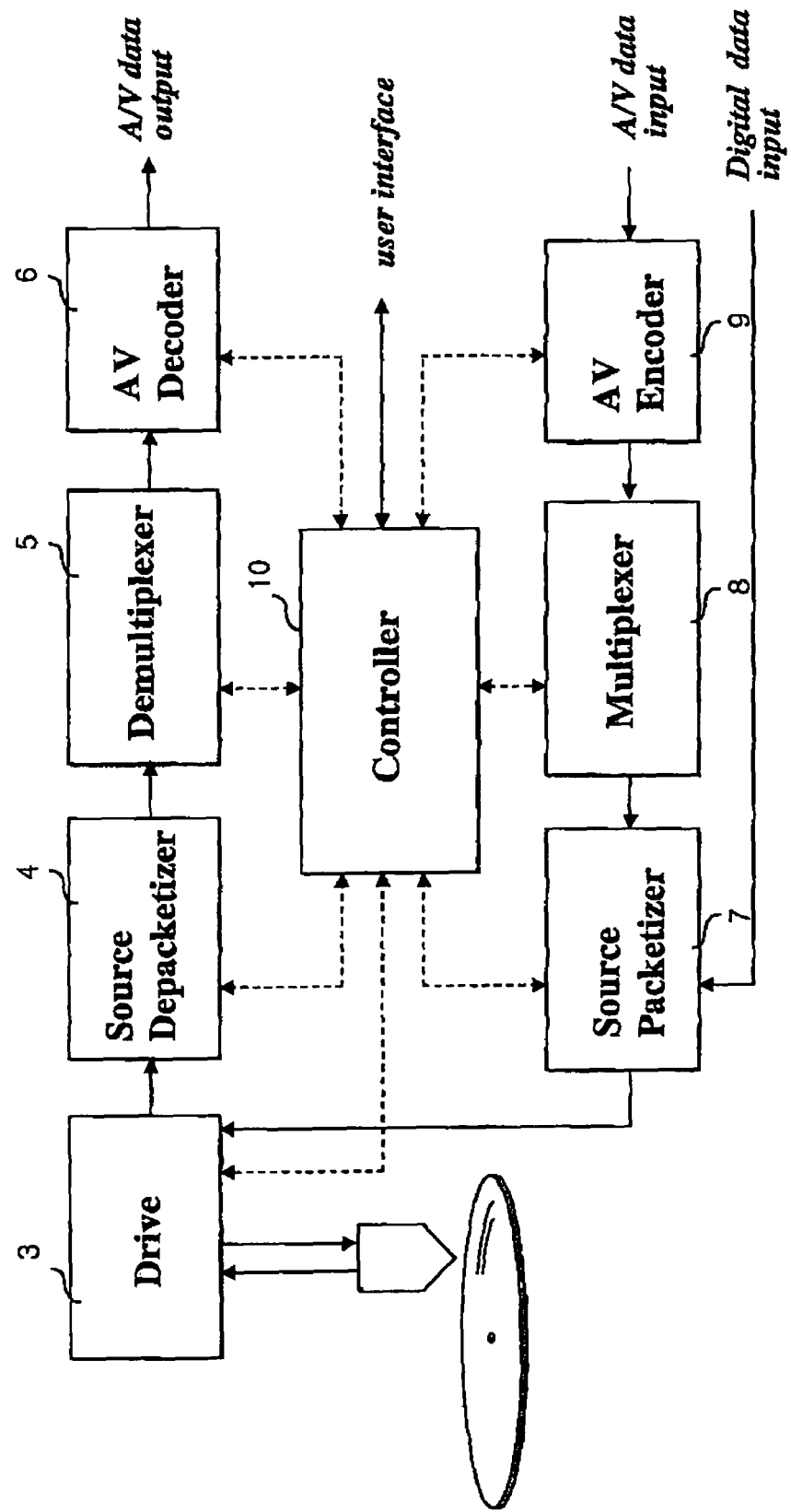
FIG. 5 illustrates a schematic diagram of an embodiment of an optical disk recording and reproduction apparatus of the present invention.

FIG. 5 illustrates a schematic diagram of an embodiment of an optical disk recording and reproducing apparatus according to the present invention. As shown, an AV encoder 9 receives and encodes audio and video data. The AV encoder 9 outputs the encoded audio and video data along with coding information and stream attribute information. A multiplexer 8 multiplexes the encoded audio and video data based on the coding information and stream attribute information to create, for example, an MPEG-2 transport stream. A source packetizer 7 packetizes the transport packets from the multiplexer 8 into source packets in accordance with the audio/ video format of the optical disk. As shown in FIG. 5, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the audio/video data being recorded on the optical disk. For example, based on information received via the user interface (e.g., instruction set saved on disk, provided over an intranet or internet by a computer system, etc.) the controller 10 controls the drive 3 to record the data structure of FIGS. 2-5 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the audio/video source packets from the optical disk. Namely, the controller 10 selects and reproduces a clip file corresponding to an arbitrary title in response to the user's reproduction request. After searching for and referring to the navigation information contained in the playlist files linked to the clip file, the controller 10 can sort the A/V streams of playback paths selected and designated by the user and perform concatenated reproduction of a set of multiple stories as discussed previously.

For example, the user input may specify a story (or playback path to reproduce). This user input may be specified, for example, via a menu based graphical user interface preprogrammed into the controller 10. Using the user input and navigation information reproduced from the optical disk, the controller 10 controls the reproduction of the playback path.

For example, to select a particular playback path, the PIDs for the TPs are examined by the controller 10 to determine the number of stories or playback paths, and the user is requested which path to reproduce. This path information may be augmented to provide more meaningful information regarding the reproduction path to reproduce. During reproduction, the first playlist associated with the selected path (e.g., associated with TPs having the selected PID) is reproduced. The navigation information then indicates the next playlist to reproduce in the group of playlists forming the selected playback path.

The reproduced packets are received by a source depacketizer 4 and converted into a data stream (e.g., an MPEG-2 transport packet stream). A demultiplexer 5 demultiplexes the data stream into encoded video and audio data. An AV decoder 6 decodes the encoded video and audio data to produce the original audio and video data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 5 has been described as a recording and reproducing apparatus, it will be understood that only a recording or only a reproducing apparatus may be provided using those portions of FIG. 5 providing the recording or reproducing function.

Figure 6:
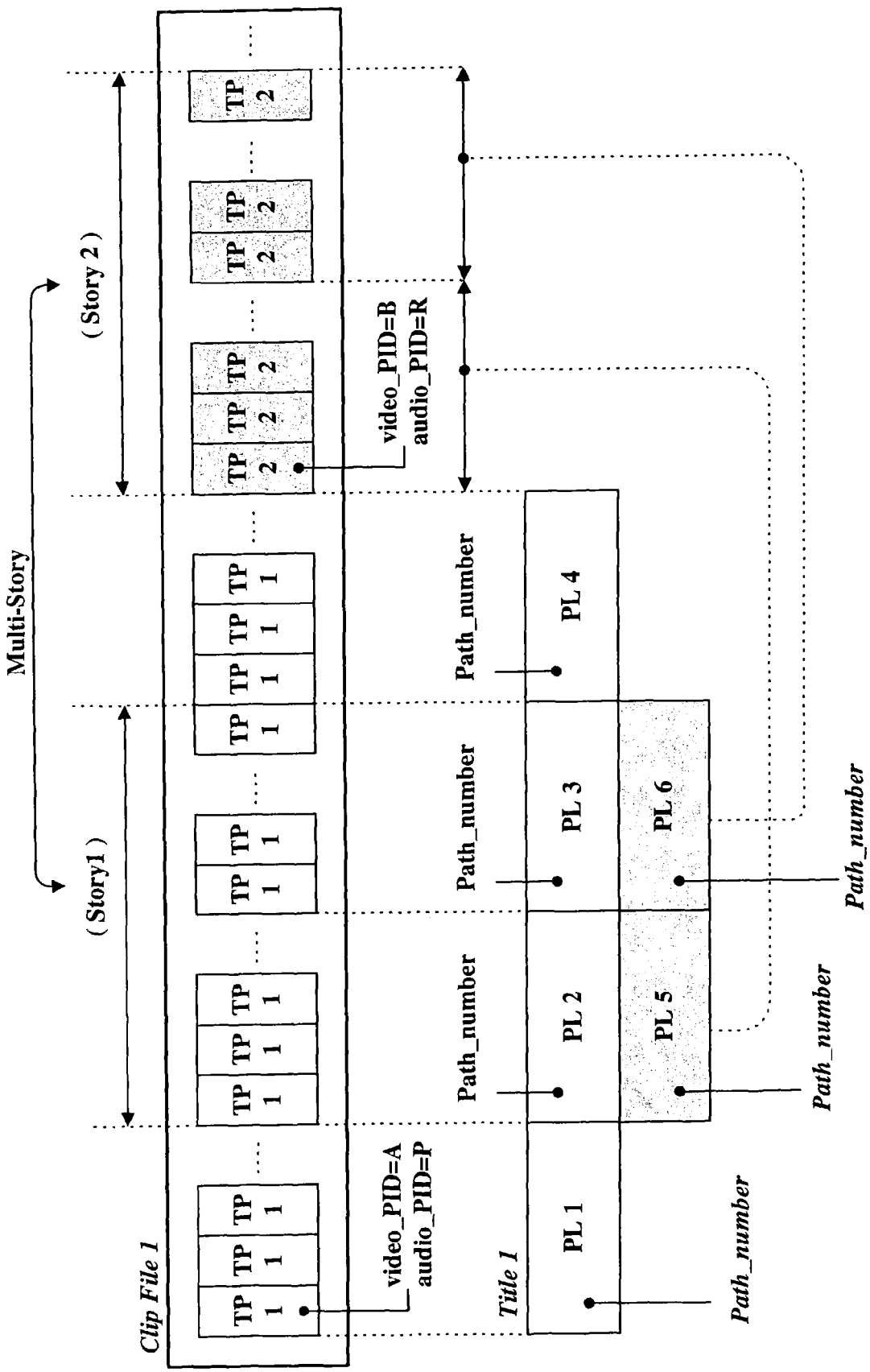
FIG. 6 illustrates a second embodiment of managing multiple playback path data streams in accordance with the present invention.

FIG. 6 illustrates a second embodiment of managing multiple playback path data streams in accordance with the present invention. The embodiment of FIG. 6 is the same as the embodiment of FIG. 4, except that the playlists also include path number information. The path number information is included in addition to or instead of the navigation information discussed above with respect to the embodiment of FIG. 4. The path number information indicates the playback path or paths with which the playlist is associated. Namely, each playback path is assigned a path number, and the path number information for a playlist provides the path number of playback path with which the playlist is associated. In this manner, the path number information may indicate with which story each playlist is associated.

The recording and reproducing apparatus of FIG. 5 operates in the same manner with respect to the embodiment FIG. 6 as was described above with respect to the embodiment of FIG. 4. However, with the embodiment of FIG. 6, the controller 10 may determine the playback paths from the path number information.

Figure 7:
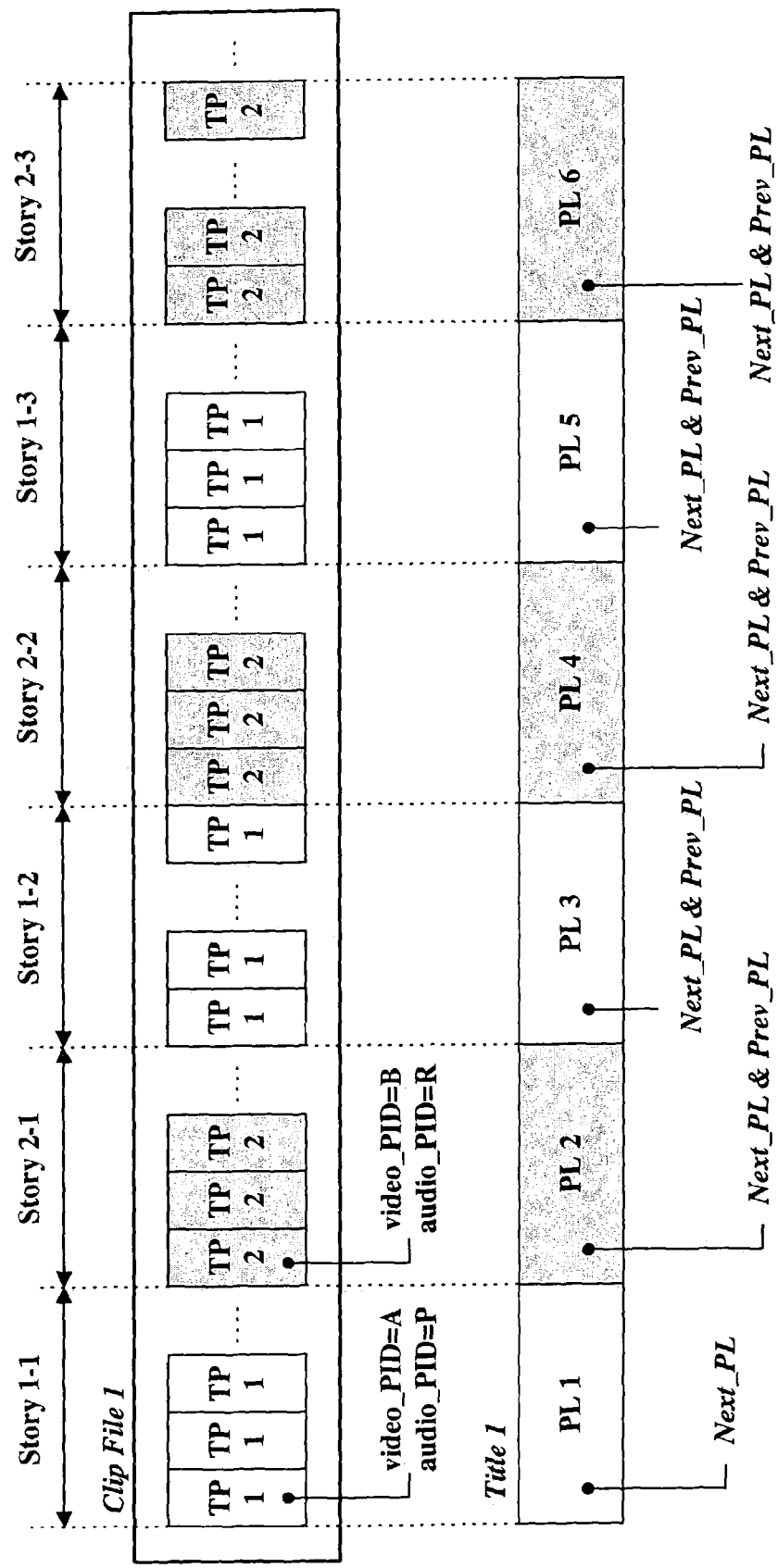
FIG. 7 illustrates a third embodiment of managing multiple playback path data streams in accordance with the present invention.

FIG. 7 illustrates a third embodiment of managing the multiple playback path data streams in accordance with the present invention. The embodiment of FIG. 7 is the same as the embodiment of FIG. 4, except for how the transport packets are recorded in the clip file. As shown in FIG. 7, the first and second transport packets TP1 and TP2 are each divided into groups of a predetermined size, and the groups are interleaved. The group size is established so that seamless playback of each playback path is possible even though the groups of transport packets for different playback paths (e.g., different stories) are interleaved.

That is, as shown in FIG. 7, in the clip file, there are interleaved recording areas for transport packet groups Story 1-1, Story 1-2, Story 1-3, . . . associated with the first story. Each group has the predetermined size and includes first transport packets TP1s associated with the first story. Also, there are interleaved recording areas for transport packet groups Story 2-1, Story 2-2, Story 2-3, . . . associated with the second story. Each group has the predetermined size and includes second transport packets TP2s associated with the second story.

As described in conjunction with FIGS. 4-5, the VDP system 3 of the optical disk apparatus selects and reproduces a clip file corresponding to an arbitrary title in response to the user's reproduction request. After searching for and referring to the navigation information contained in the playlist files linked to the clip file, the VDP system 3 can sort the A/V streams of stories selected and designated by the user and perform concatenated reproduction of a set of multiple playback paths as discussed previously.

Figure 8:
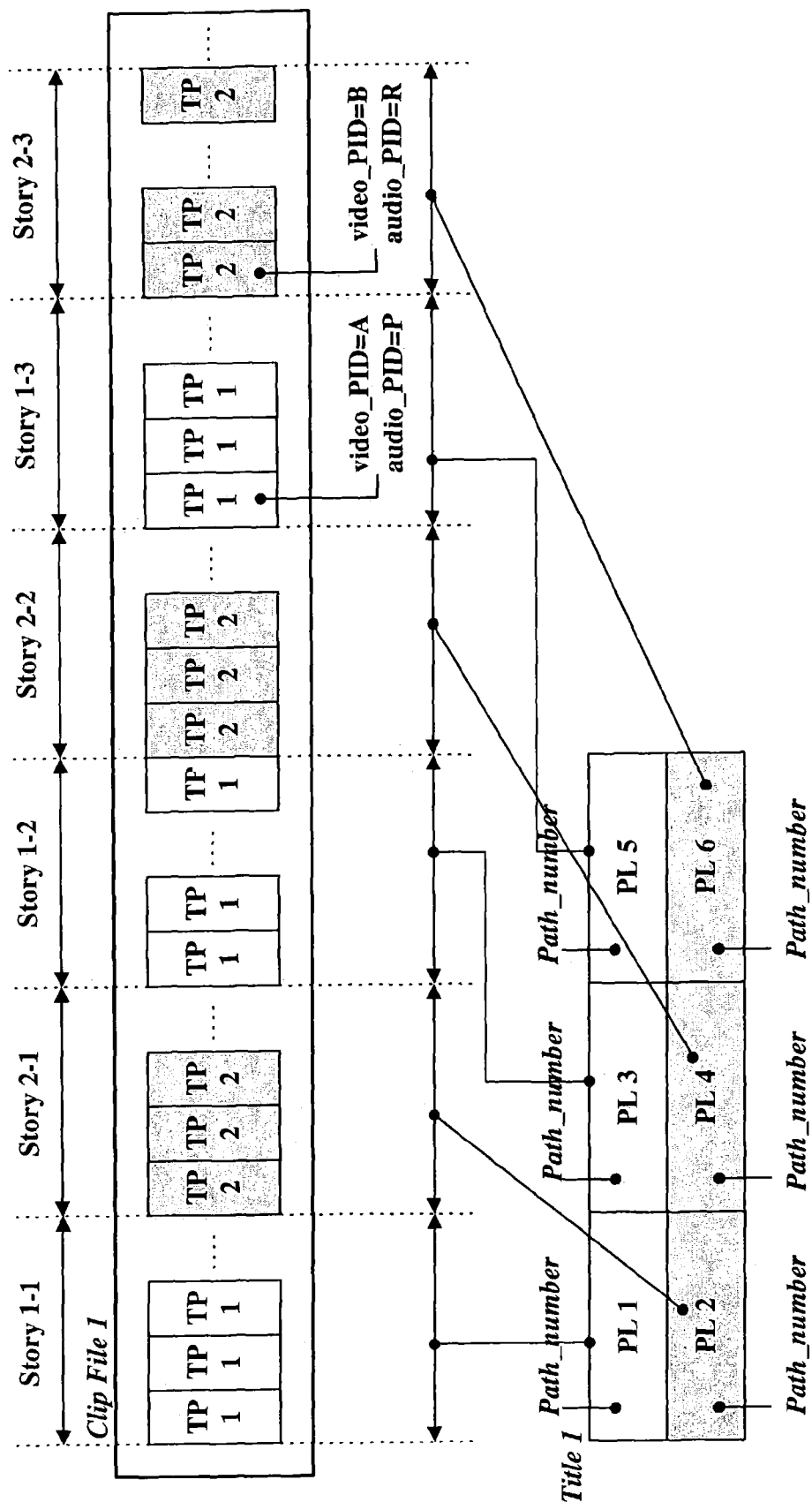
FIG. 8 illustrates a fourth embodiment of managing multiple playback path data streams in accordance with the present invention.

FIG. 8 illustrates a fourth embodiment of managing multiple playback path data streams in accordance with the present invention. The embodiment of FIG. 8 is the same as the embodiment of FIG. 7, except that the playlists also include path number information. The path number information is included in addition to or instead of the navigation information discussed above with respect to the embodiment of FIG. 7. The path number information indicates the playback path or paths with which the playlist is associated. Namely, each playback path is assigned a path number, and the path number information for a playlist provides the path number of playback path with which the playlist is associated.

In this manner, the path number information indicates with which playback path each playlist is associated.

The recording and reproducing apparatus of FIG. 5 operates in the same manner with respect to the embodiment of FIG. 8 as was described above with respect to the embodiment of FIG. 7. However, with the embodiment of FIG. 8, the controller 10 may determine the playback paths from the path number information.

Figure 9:
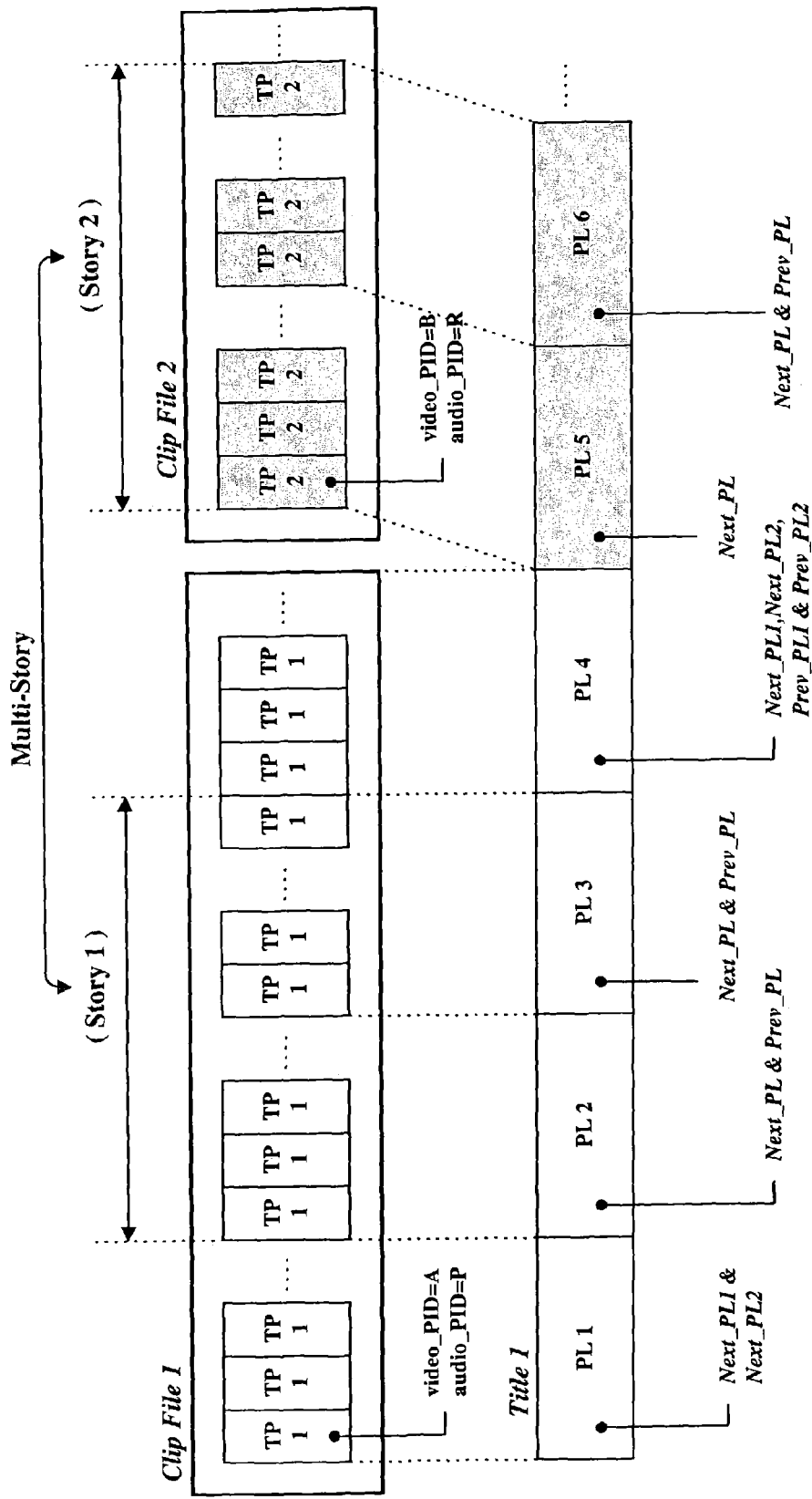
FIG. 9 illustrates a fifth embodiment of managing multiple playback path data streams in accordance with the present invention.

FIG. 9 illustrates a fifth embodiment of managing the multiple playback path data streams in accordance with the present invention. The embodiment of FIG. 9 is the same as the embodiment of FIG. 4, except that the transport packets associated with different playback paths are not recorded in the same clip file. Instead, the transport packets associated with different playback paths (e.g., different stories) are recorded in different clip files.

As shown in FIG. 9, first and second clip files 1 and 2, in the file structure of the BD-ROM, are linked to the plurality of playlists (PL1, PL2, PL3, . . . ) of a title. Moreover, the first transport packets TP1 associated with the first story and having Video_PID=A and Audio_PID=P are recorded in the first clip file, while the second transport packets TP2 associated with the second story and having Video_PID=B and Audio_PID=R are recorded the second clip file.

As described in conjunction with FIG. 5, the VDP system 3 of the optical disk apparatus selects and reproduces a clip file corresponding to an arbitrary title in response to the user's reproduction request. After searching for and referring to the navigation information contained in the playlist files linked to the clip file, the VDP system 3 can sort the A/V streams of stories selected and designated by the user and perform concatenation reproduction of a set of multiple playback paths as described with respect to FIG. 4.

Figure 10:
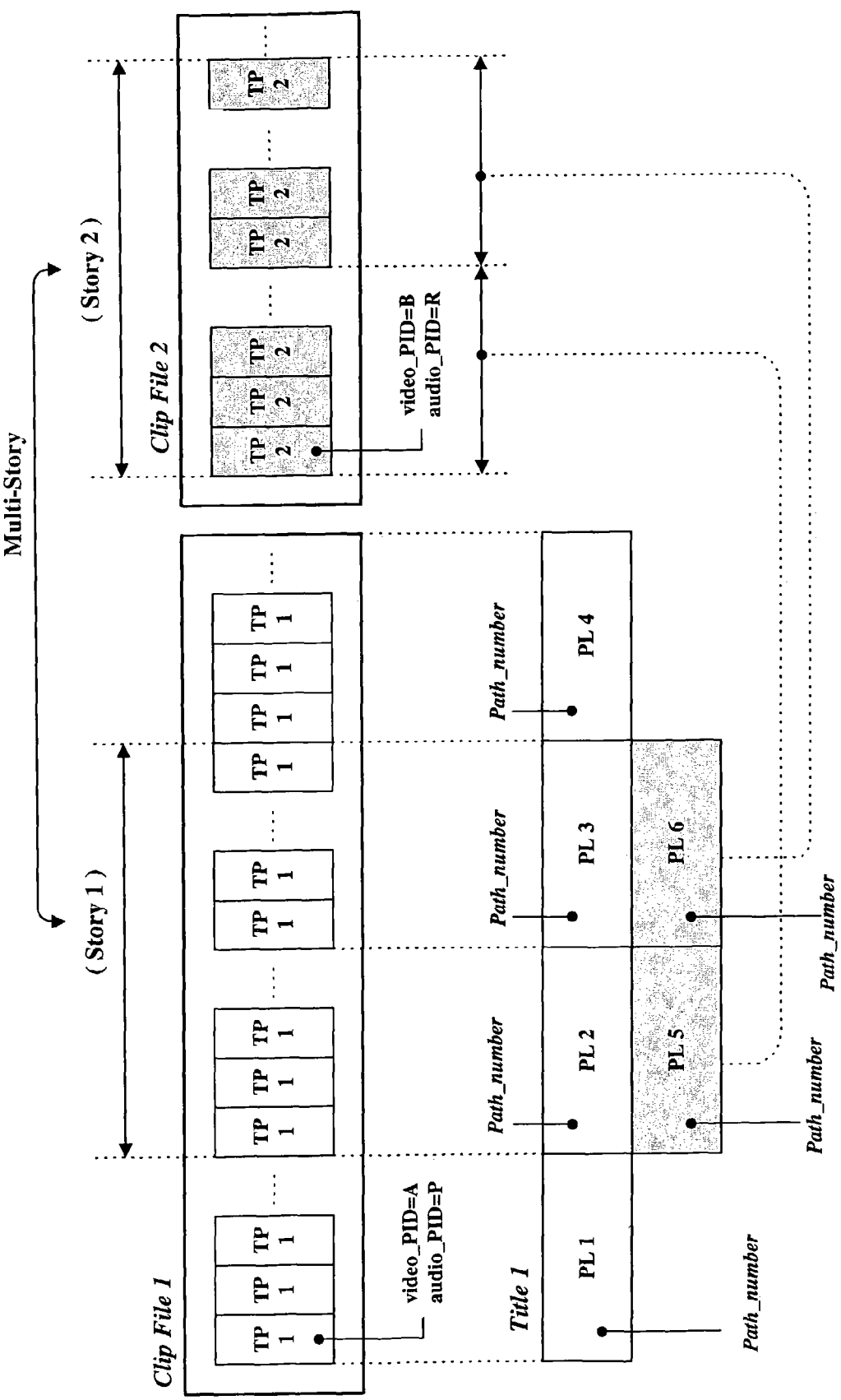
FIG. 10 illustrates a sixth embodiment of managing multiple playback path data streams in accordance with the present invention.

FIG. 10 illustrates a sixth embodiment of managing multiple playback path data streams in accordance with the present invention. The embodiment of FIG. 10 is the same as the embodiment of FIG. 9, except that the playlists also include path number information. The path number information is included in addition to or instead of the navigation information discussed above with respect to the embodiment of FIG. 9. The path number information indicates the playback path or paths with which the playlist is associated. Namely, each playback path is assigned a path number, and the path number information for a playlist provides the path number of playback path with which the playlist is associated. In this manner, the path number information indicates with which playback path each playlist is associated.

The recording and reproducing apparatus of FIG. 5 operates in the same manner with respect to the embodiment FIG. 10 as was described above with respect to the embodiment of FIG. 9. However, with the embodiment of FIG. 10, the controller 10 may determine the playback paths from the path number information.

Figure 11:
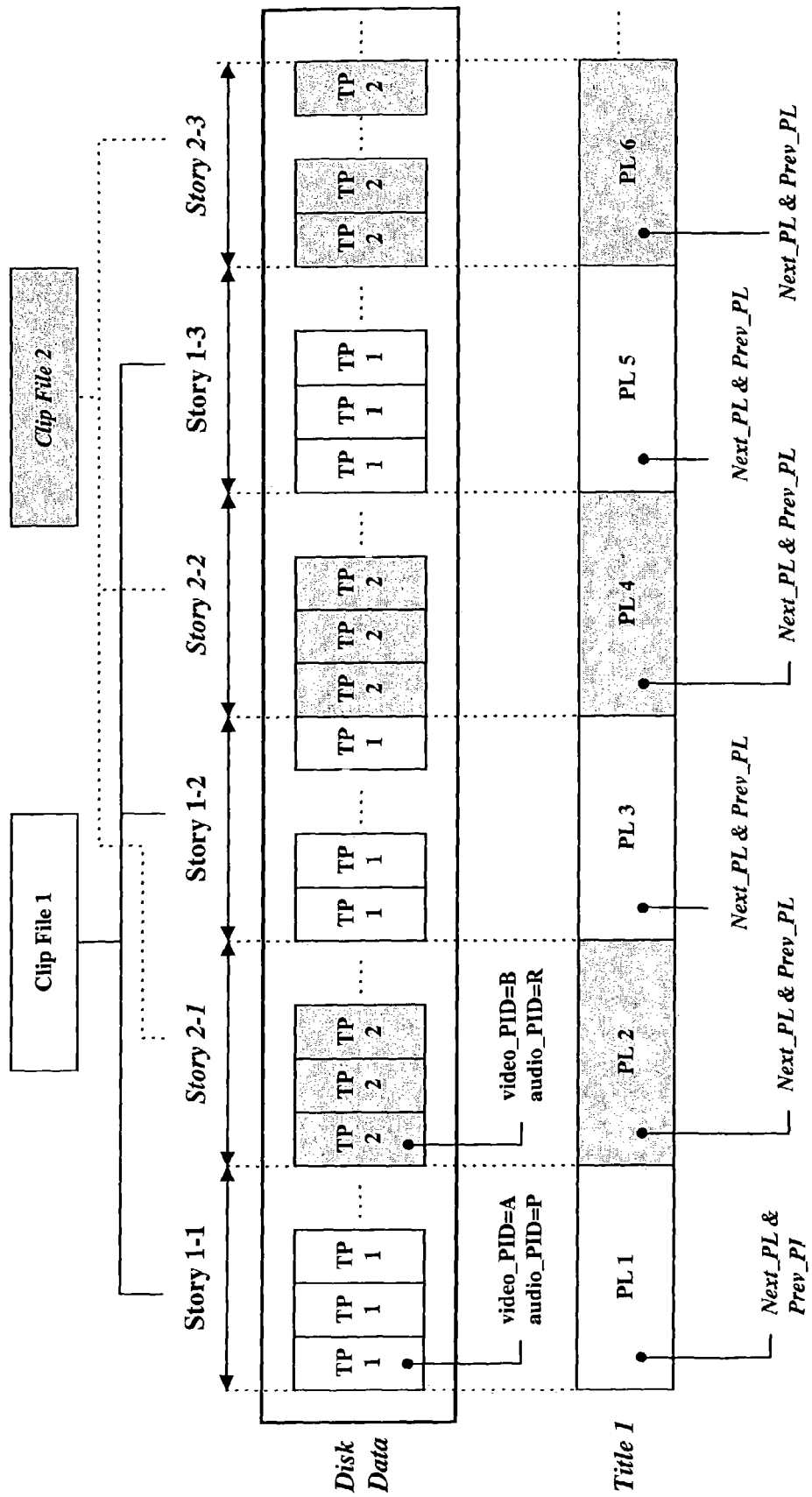
FIG. 11 illustrates a seventh embodiment of managing multiple playback path data streams in accordance with the present invention.

FIG. 11 illustrates a seventh embodiment of the method for managing the multiple playback path data streams in accordance with the present invention. The embodiment of FIG. 11 is the same as the embodiment of FIG. 9, except for how the transport packets are recorded on the recording medium. As shown in FIG. 11, the first and second transport packets TP1 and TP2 are each divided into groups of a predetermined size, and the groups are interleaved. The group size is established so that seamless playback of each playback path is possible even though the groups of transport packets for different playback paths (e.g., different stories) are interleaved.

That is, as shown in FIG. 11, in the clip file, there are interleaved recording areas for transport packet groups Story 1-1, Story 1-2, Story 1-3, . . . associated with the first story. Each group has the predetermined size and includes first transport packets TP1s associated with the first story. Also, there are interleaved recording areas for transport packet groups Story 2-1, Story 2-2, Story 2-3, . . . associated with the second story. Each group has the predetermined size and includes second transport packets TP2s associated with the second story.

As described in conjunction with FIGS. 4-5, the VDP system 3 of the optical disk apparatus selects and reproduces a clip file corresponding to an arbitrary title in response to the user's reproduction request. After searching for and referring to the navigation information contained in the playlist files linked to the clip file, the VDP system 3 can sort the A/V streams of stories selected and designated by the user and perform concatenated reproduction of a set of multiple stories as discussed previously.

Figure 12:
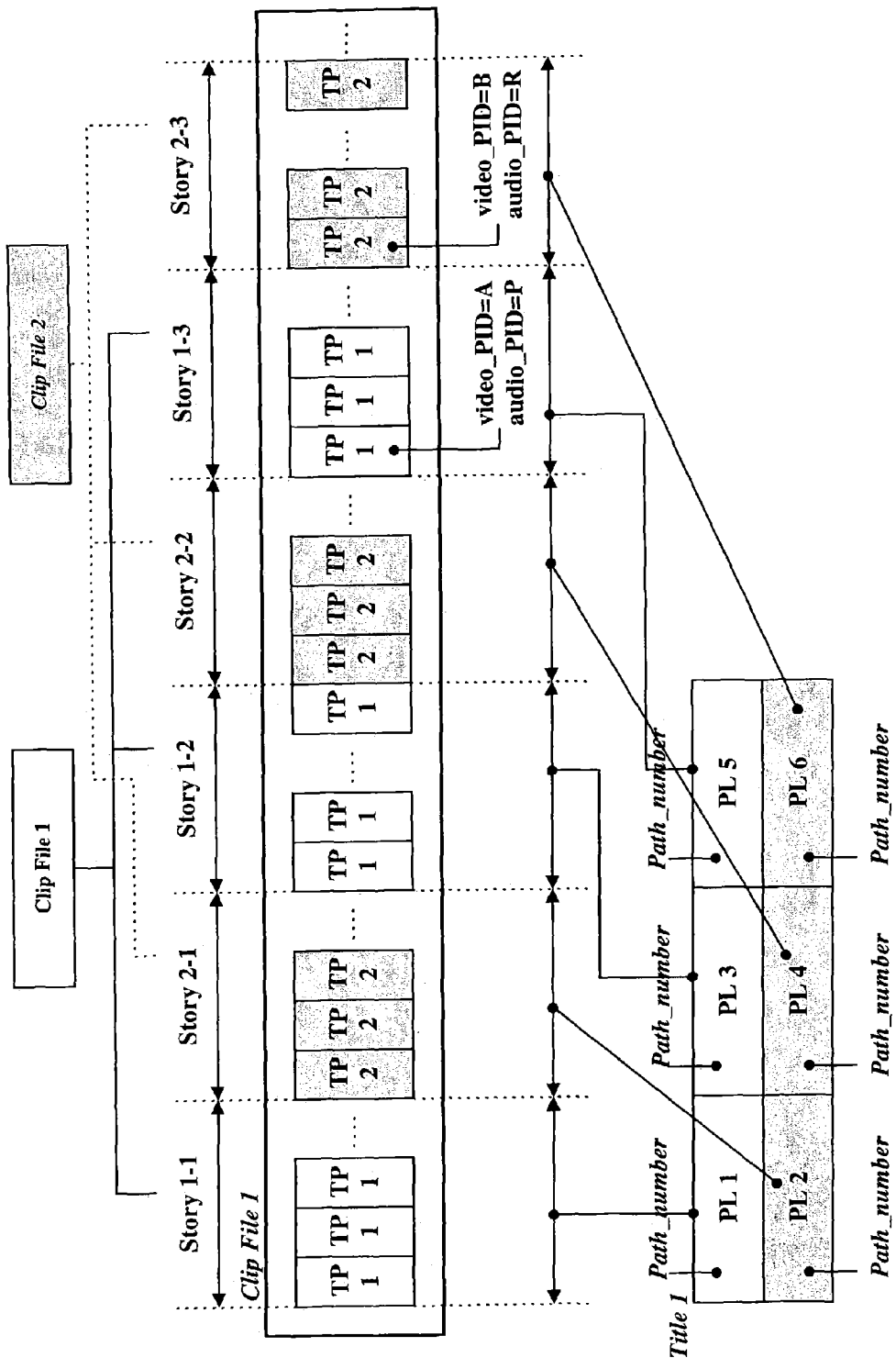
FIG. 12 illustrates an eighth embodiment of managing multiple playback path data streams in accordance with the present invention.

FIG. 12 illustrates an eighth embodiment of managing multiple playback path data streams in accordance with the present invention. The embodiment of FIG. 12 is the same as the embodiment of FIG. 11, except that the playlists also include path number information. The path number information is included in addition to or instead of the navigation information discussed above with respect to the embodiment of FIG. 11. The path number information indicates the playback path or paths with which the playlist is associated. Namely, each playback path is assigned a path number, and the path number information for a playlist provides the path number of playback path with which the playlist is associated. In this manner, the path number information indicates with which story each playlist is associated.

The recording and reproducing apparatus of FIG. 5 operates in the same manner with respect to the embodiment of FIG. 12 as was described above with respect to the embodiment of FIG. 11. However, with the embodiment of FIG. 12, the controller 10 may determine the playback paths from the path number information.

As will be appreciated, the clip files (*.m2ts) in the above-described embodiments are also linked to one or more playitems in each playlist. In this case, concatenation information of the previous and next playitems (Prev_PI and Next_PI) for designating the order of reproduction of the multiple stories or the path number information may be contained and recorded in the playlist files.

Also, the present invention is not limited to having a single title recorded on the recording medium. An additional title directory and an additional title file may be recorded in the file structure of the present invention.

As apparent from the above description, the present invention provides for managing multiple playback path data streams of a high-density optical disk. As such the reproducing method and apparatus of the present invention can quickly and correctly sort data streams of playback paths selected and designated by a user, and reproduce the sorted data streams.

While the invention has been disclosed with respect to a limited number of embodiments, those skilled in the art, having the benefit of this disclosure, will appreciate numerous modifications and variations there from. For example, while described with respect to a Blu-ray ROM optical disk, the present invention is not limited to this standard of optical disk or to optical disks. It is intended that all such modifications and variations fall within the spirit and scope of the invention.

What is claimed is:

1. An optical recording medium having a data structure for managing reproduction of video data having multiple playback paths in a title, comprising:

a data directory storing a plurality of clip files of the video data having the multiple playback paths, each clip file including a plurality of data packets of the video data, each clip file being associated with one path of the multiple playback paths, each data packet having a packet number differentiating the data packet from other data packets in the plurality of data packets;

a management directory storing management information for managing reproduction of the video data having the multiple playback paths, the management information including a plurality of clip information files, each clip file being associated with one of the clip information files, the clip information file providing at least one map, the map identifying at least one entry point for the associated clip file by identifying the packet number of the data packet of the at least one entry point, the map mapping a presentation time stamp to a corresponding address in the associated clip file; and a playlist directory storing a playlist file associated with the multiple playback paths, the playlist file including at least one playitem identifying a playing interval from in-time until out-time for playback of the video data, each playitem identifying a same playing interval in of the plurality of clip files associated with the multiple playback paths for the playlist file, the playitem identifying clip information files associated with the clip files, the playlist file storing connection information between a previous playitem and a current playitem, wherein the playitem indicates whether a portion of the video data represents the multiple playback paths.

2. The optical recording medium of claim 1, wherein a group of playlist files is associated with each playback path.

3. The optical recording medium of claim 1, further comprising:
navigation information managing the playlist file to be reproduced.

4. The optical recording medium of claim 3, wherein the different playback paths are related to different stories.

5. The optical recording medium of claim 1, wherein the video data for each playback path is stored in a different clip file.

6. The optical recording medium of claim 1, wherein the at least one clip file is linked to more than one of the plurality of playlist files.

7. The optical recording medium of claim 1, wherein the clip file includes source packets, the source packets including a header and a transport packet, the transport packet including a packet identifier (PID), the source packet including a source packet number indicating the address in the clip file.

8. The optical recording medium of claim 1, wherein the playlist file includes playback information indicating a playback type of the playitem, the playback type including sequential playback of the playitem.

9. A method of reproducing a data structure for managing reproduction of video data having multiple playback paths in a title from a recording medium, the method comprising:
reproducing a playlist file associated with the multiple playback paths, the playlist file from the recording medium identifying a playing interval from in-time until out-time for playback of the video data, each playitem identifying a same playing interval in file of the plurality of clip files associated with the multiple playback paths for the playlist file;

reproducing management information for managing reproduction of the video data having the multiple playback paths from a management area of the recording medium; and reproducing at least one clip file of the video data having the multiple playback paths from a specific entry point identified by a packet number based on the playlist file and the management information, wherein each clip file including a plurality of data packets of the video data, each clip file being associated with one path of the multiple playback paths, each data packet having a packet number differentiating the data packet from the other data packets in plurality of data packets, the playitem identifying clip information files associated with the clip files, the playlist file storing connection information between a previous playitem and a current playitem, the management information including the plurality of clip information files, each clip file being associated with one of the clip information files, the clip information file providing at least one map, the map identifying at least one entry point for the associated clip file by identifying the packet number of the data packet of the at least one entry point, the map mapping a presentation time stamp to a corresponding address in the associated clip file, wherein the playitem indicates whether a portion of the video data represents the multiple playback paths.

10. The method of claim 9, wherein the reproducing step reproduces a group of playlist files based on navigation information for managing the playlist files.

11. The method of claim 9, further comprising:
reproducing navigation information stored on the recording medium, the navigation information for managing the playlist file.

12. The method of claim 11, wherein the reproducing at least one playlist file reproduces a group of playlist files based on the navigation information.

13. A method of recording a data structure for managing reproduction of at least video data having multiple playback paths in a title on a recording medium, the method comprising:
recording a plurality of clip files of the video data having multiple paths on the recording medium, each clip file including a plurality of data packets of the video data, each clip file being associated with one path of the multiple playback paths, each data packet having a packet number differentiating the data packet from other data packets in the plurality of data packets;

recording management information for managing reproduction of the video data of the recording medium, the management information including a plurality of clip information files, each clip file being associated with one of the clip information files, the clip information file providing at least one map identifying at least one entry point for the associated clip file by identifying the packet number of the data packet of the at least one entry point, the map mapping a presentation time stamp to a corresponding address in the associated clip file; and recording a playlist file associated with the multiple playback paths, the playlist file including at least one playitem identifying a playing interval from in-time until out-time for playback of the video data, each playitem identifying a same playing interval in the plurality of clip files associated with the multiple playback paths for the playlist file, the playitem identifying clip information files associated with the clip files, the playlist file storing connection information between a previous playitem and a current playitem, wherein the playitem indicates whether a portion of the video data represents the multiple playback paths.

14. The method of claim 13, further comprising:
recording navigation information for managing the playlist file.

15. The method of claim 14, wherein the recording at least one playlist file records a group of playlist files based on the navigation information.

16. An apparatus for recording a data structure for managing reproduction of at least video data having multiple playback paths in a title, comprising:
an optical pickup configured to record data on a recording medium; and
a controller, operably coupled to the optical pickup, configured to control the optical pickup to record a plurality of clip files of the video data having the multiple playback paths on the recording medium, each clip file including a plurality of data packets of the video data, each clip file being associated with one path of the multiple playback paths, each data packet having a packet number differentiating the data packet from other data packets in the plurality of data packets, the controller configured to control the optical pickup to record management information for managing reproduction of the video data having the multiple playback paths on the recording medium, the management information including a plurality of clip information files, each clip file being associated with one of the clip information files, the clip information file providing at least one map identifying at least one entry point for the associated clip file by identifying the packet number of the data packet of the at least one entry point, the map mapping a presentation time stamp to a corresponding address in the associated clip file, the controller configured to control the optical pickup to record a playlist file associated with the multiple playback paths on the recording medium, the playlist file including at least one playitem identifying a playing interval from in-time until out-time for playback of the video data, each playitem identifying a same playing interval in the plurality of clip files associated with the multiple playback paths for the playlist file, and the playitem identifying the clip information files associated with the clip files, the playlist file storing connection information between a previous playitem and a current playitem,
wherein the playitem indicates whether a portion of the video data represents the multiple playback paths.

17. The apparatus of claim 16, wherein a group of playlist files is associated with each playback path.

18. The apparatus of claim 17, wherein navigation information is stored on the recording medium, the navigation information for managing the playlist file.

19. An apparatus for reproducing a data structure for managing reproduction of at least video data having multiple playback paths in a title, comprising:
an optical pickup configured to reproduce data recorded on a recording medium; and
a controller, operably coupled to the optical pickup, configured to control the optical pickup to reproduce a playlist file associated with the multiple playback paths from the recording medium, the playlist file including at least one playitem identifying a playing interval from an in-time until an out-time for playback of the video data, each playitem identifying a same playing interval in the plurality of clip files associated with the multiple playback paths for the playlist file,
the controller configured to control the optical pickup to reproduce management information for managing reproduction of the video data having the multiple playback paths from a management area of the recording medium,
the controller configured to control the optical pickup to reproduce at least one clip file of the video data having the multiple playback paths from a specific entry point identified by a packet number based on the playlist file and the management information,
wherein each clip file including a plurality of data packets of the video data, each clip file being associated with one path of the multiple playback paths, each data packet having a packet number differentiating the data packet from the other data packets in the plurality of data packets, the playitem identifying clip information files associated with the clip files, the playlist file storing connection information between a previous playitem and a current playitem,
the management information including the plurality of clip information files, each clip file being associated with one of the clip information files, the clip information file providing at least one map, the map identifying at least one entry point for the associated clip file by identifying the packet number of the data packet of the at least one entry point, the map mapping a presentation time stamp to a corresponding address in the associated clip file,
wherein the playitem indicates whether a portion of the video data represents the multiple playback paths.

20. The apparatus of claim 19, wherein a group of playlist files is associated with each playback path.

21. The apparatus of claim 20, wherein navigation information is stored on the recording medium, the navigation information for managing the playlist file.

* * * * *